April 22, 1941.   J. H. ZESEWITZ   2,239,637
SPINDLE SEAL FOR FLUID PRESSURE MOTORS
Filed April 30, 1940   2 Sheets-Sheet 1
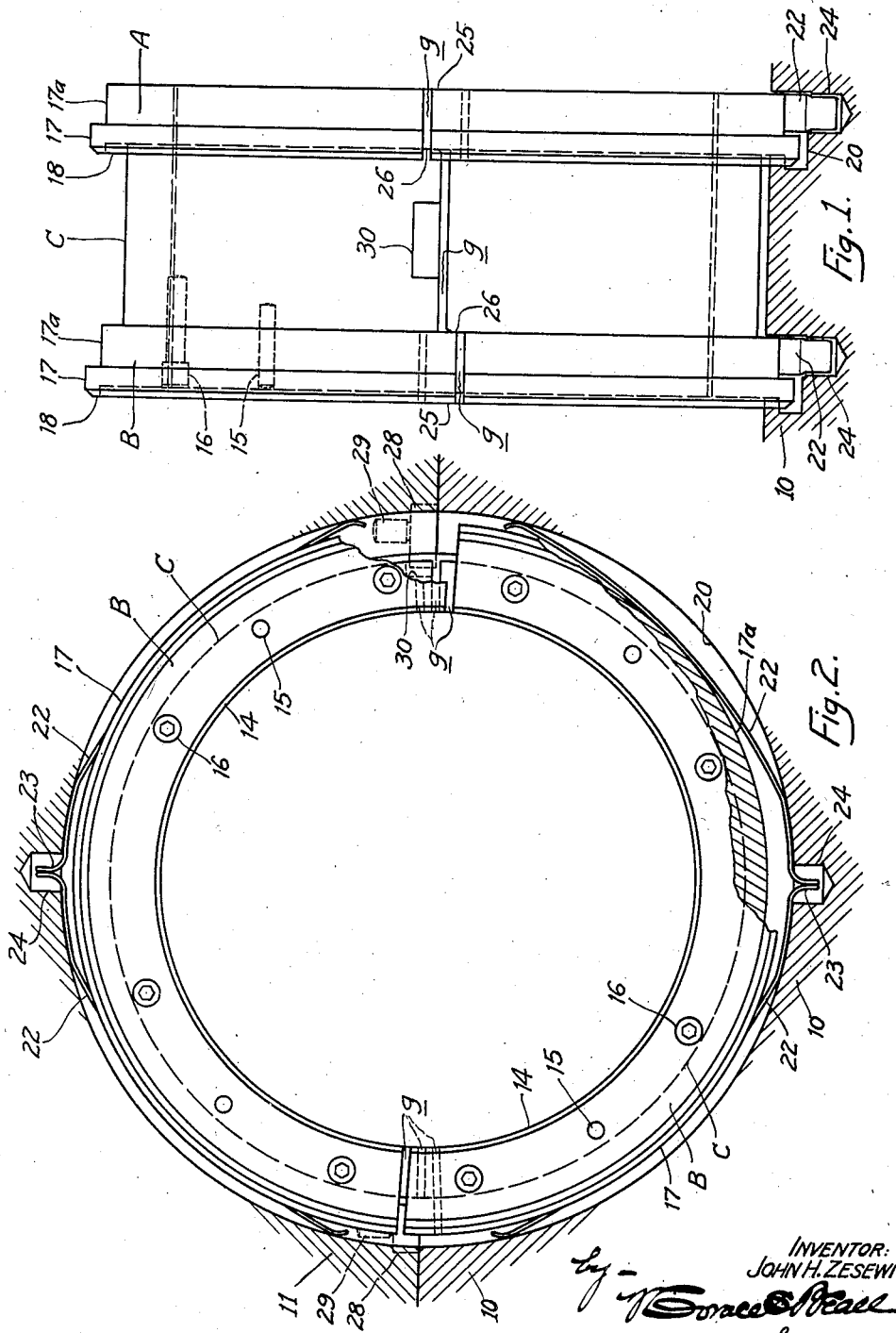
INVENTOR:
JOHN H. ZESEWITZ
ATTORNEY.

April 22, 1941.     J. H. ZESEWITZ     2,239,637
SPINDLE SEAL FOR FLUID PRESSURE MOTORS
Filed April 30, 1940     2 Sheets-Sheet 2

INVENTOR:
JOHN H. ZESEWITZ
ATTORNEY.

Patented Apr. 22, 1941

2,239,637

UNITED STATES PATENT OFFICE 2,239,637

SPINDLE SEAL FOR FLUID PRESSURE MOTORS

John H. Zesewitz, Philadelphia, Pa.

Application April 30, 1940, Serial No. 332,613

6 Claims. (Cl. 286—10)

My invention is an improvement in spindle sealing devices or shaft packings of that type commonly known as labyrinth packing designed for use in association with high-pressure, high-temperature steam turbines and other fluid pressure engines, the invention in this instance having particular reference to those parts of the seal unit or packing which support the stationary elements of the sealing labyrinth.

An important desideratum in the provision of a spindle seal is to prevent leakage of the high-pressure fluid, not only with reference to the labyrinth along the spindle through which the flow of the elastic fluid is obstructed or retarded, but also through the cooperating parts supporting the stationary labyrinth elements enclosed within the casing or housing of the seal unit—consideration being given to the particular degree of operating temperature which may as high as 950 degrees Fahrenheit, and to which the elements and parts constituting the seal unit or packing are subjected. It is likewise desirable to make suitable provision in the seal unit to prevent excessive leakage of the elastic fluid when the temperature is considerably lower, as in starting a turbine.

In the construction of a seal unit or packing of this general character it is customary to employ opposing concentric annular ribs which also act as heat dissipating elements around the spindle to form the labyrinth, with the inwardly projecting ribs cooperating with those on the spindle and carried by rings made up of sections or segments suspended within a casing or housing, but insofar as has been observed there is usually appreciable leakage of the elastic fluid through the joints of the ring segments as well as other defects, including ill effects caused by rust and scale, resulting in a decrease in the effectiveness of the seal unit or shaft packing thus lowering the general efficiency of the turbine, especially after prolonged service.

It is the main purpose of my invention therefore to provide a more efficient seal unit or packing of this type whereby leakage through the seal unit is reduced to a minimum by the medium of supporting segmental rings of special construction that will not only provide tightly closed joints of the seal ring segments during the operation of the turbine or rotor, but will automatically coact with the fluid pressure in keeping themselves forcibly closed by the establishment of an intermediate pressure zone between the seal unit and housing, and between the high-pressure and low-pressure ends of the seal unit.

The present invention therefore contemplates a particular construction and arrangement of parts constituting the seal unit or shaft packing producing an independently expanding, radially yielding, and self sealing organization for use in association with elastic fluid turbines and other rotors operated under high fluid pressures of a magnitude of up to 1,200 pounds per square inch or more, and requiring a packing of this nature to obstruct or retard the escape of the elastic fluid medium employed, it being understood that for extremely high fluid pressures a number of the seal units in accordance with my invention will be arranged in a series group to insure a fully efficient sealing means.

The following specification is a description of my improved construction of spindle seal unit, and what I claim as new and desire to protect by Letters Patent is more specifically set forth in the appended claims.

In the drawings—

Figure 1 is a side view of the spindle seal unit or shaft packing constructed in accordance with my invention.

Fig. 2 is a side elevation thereof, portions of the casing or housing being shown in section.

Figure 4:
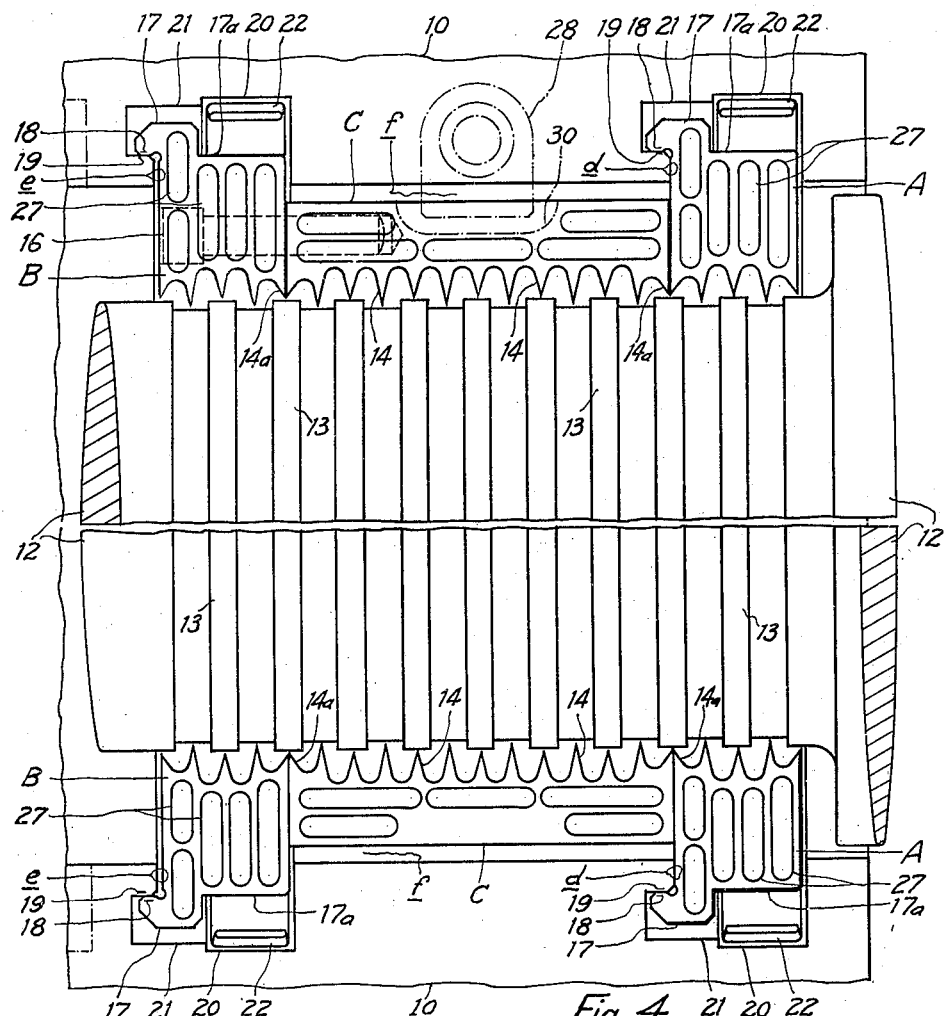
Fig. 4 is an elevation of the lower half of a seal unit with portions of the housing base and the spindle shown.

The elements of construction employed in carrying out my invention are mounted in a casing or housing of two parts 10 and 11, see Fig. 2, adapted to fit one upon the other and forming part of the main turbine housing, said casing enclosing the seal unit, hereinafter described, through which extends the spindle or shaft 12 provided with circumferential ribs 13, see Fig. 4, of any approved shape in cross section to cooperate with companion ribs 14 on the stationary seal rings forming the labyrinth through which the elastic fluid under pressure tends to pass from the high-pressure end of the spindle seal unit, at the right of Fig. 4, to the low-pressure end at the left.

In carrying out my invention the segmental rings suspending the ribs 14 of the labyrinth are in this instance three in number, those at the outer sides of the seal unit being narrow and similar in construction for interlocking engagement with the casing, while the third or center ring is wider and has a plain circumference corresponding with the cylindrical portion of the casing, and for convenience in description these rings are designated by the letters A, B, and C, respectively, with the rings at opposite sides of the center ring connected thereto by dowels 15 and bolts 16, see Figs. 1 and 2. In the present instance I have shown the several segmental rings made up in half sections, but it will be understood that quarter sections may be adopted if desired, and that more or less than three rings may be employed in forming a seal unit.

As the rings A and B at opposite sides of the seal unit are alike in construction and engage like annular recesses in the housing, a description of one of said rings will apply to the other, the same numerals of reference being employed. Therefore each ring is provided around its periphery at one of the side edges thereof with a raised rim 17 extended laterally beyond the adjoining side of the ring to form a sidewise projecting flange 18, whereas the depressed circumference 17a of the ring forms a seat for flat springs, hereinafter referred to, while the flange 18 engages a shoulder 19 formed on the housing, and to coact with the springs, flange and the outer edge of the ring the housing is provided with an annular recess one portion 20 of which is deeper to accomodate the springs and the adjoining portion 21 is shallower and extended to one side to form the aforementioned shoulder 19 cooperating with the flange 18.

As each outer ring is made in two sections said sections are urged towards each other by means of pairs of flat springs 22—22, 22—22, extending from the outer central portion of each section in the direction of the ends thereof, being held in place by the contiguous bent ends 23 of the springs engaging recesses 24 in the housing, it being noted by reference to Fig. 2 that these springs curve under moderate tension and are in contact with the depressed circumference 17a of the ring and the groove 20 of the housing.

With this method of connecting the segmental rings to the housing as shown in Fig. 4 the retaining flanges 18 project laterally in the same direction; consequently the retaining flange of one of the rings is at the outer side thereof and the flange of the other ring at the inner side, for more effective reaction of the assembled parts under temperature changes and pressure acting from the high-pressure end at the right. Thus in effect two circular spigot seats $d$ and $e$ are formed between the sides of rings A and B and the two separate retaining ledges 19 of the housing, respectively. This in turn creates an isolated intermediate pressure chamber $f$ which in operation coacts with the springs 22 in forcing the upper and the lower halves of the assembled seal unit together—as governed by the retaining ledges—into central suspension in the housing. It should be noted in this connection that, with the object of greater stability in mind, said retaining flanges 18 of the seal unit, engaging the housing shoulders 19, are widely separated by the provision of a wide center ring C as shown in Fig. 4.

Figure 3:
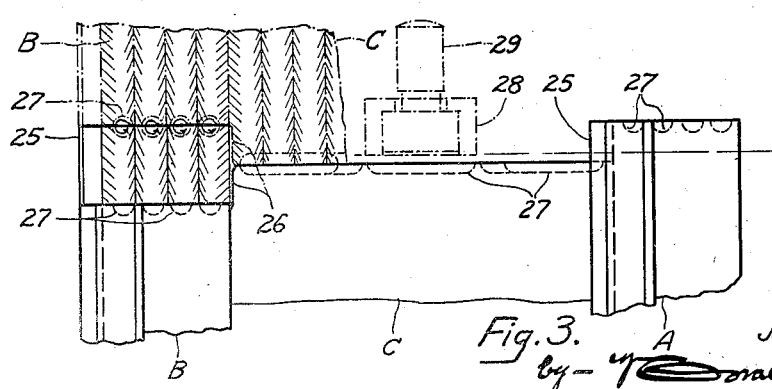
Fig. 3 is a fragmental view of one end of the assembled ring segments illustrating the formation of the joint between the companion ring segments.

In a complete seal unit the two sections of each ring A and B respectively are joined on a central plane angularly offset from the plane of the horizontal joint between the two sections 10 and 11 of the housing, while the joints of the half sections of the ring C correspond with said horizontal joint of the housing. The resultant assembly of a seal unit has two stepped joints, details of which are shown in Figs. 1 and 3 where for this purpose the ends of the segments of the rings A, B, and C are overlapping; that is to say, the projecting ends 25 of each segment of the rings A and B extend beyond the ends 26 of the segments of the companion ring C, and by reference to Fig. 2 of the drawings it will be noted that, for interlocking engagement against lateral movement of the half sections of the complete seal unit with respect to each other, the end projections of each segment are at opposite sides of each half section. These stepped horizontal joints of the seal unit will greatly improve the sealing effect by blocking an otherwise direct blow-by path along these joints and serve to key the halves of the unit together into correct lateral alignment.

To increase the effectiveness of the joints further the meeting surfaces of each are provided with groups of grooves 27, with those on the faces of the joint of one segment registering or matching with those of the companion segment to form small turbulence chambers in which any blow-by of the elastic fluid will set up bucking eddies, indicated by small arrows in Fig. 3, which effect a decrease in the velocity of such blow-by. This provision of grooves 27 in the meeting faces has also another object, namely that of reducing the contact area of the faces, thus increasing the contact unit pressure of the remaining joint surface area. Furthermore, there will be less contact surface subject to deposit of the inevitable fine scale matter which is shed by piping and the turbine housing and carried into the joints by the flow of the elastic fluid. Such scale matter might hold the joints slightly open when the turbine is being started for operation; however, due to the grooving of the faces it will more readily be blown away.

Provision must be made to keep the assembled seal unit from creeping or rotating in its enclosure or housing; therefore, retaining keys 28 are let into the meeting face of the housing cover 11 and secured by screws 29 thereto. These keys engage milled recesses 30 on opposite sides of the upper segment of the ring C directly above the joint surface, as shown in Fig. 1 and indicated by the dot and dash views in Figs. 3 and 4.

The assembling of the parts of the seal unit will be obvious from the foregoing description in connection with the accompanying drawings, for after positioning the lower connected segments of the rings within the lower portion 10 of the housing to partly encircle the spindle or shaft, with the overlapping ends 25 of the end segments projecting above the plane of the housing horizontal joint, the connected upper ring segments similarly installed in the housing cover 11 and retained therein by the keys 28 are lowered thereon. As this is done the housing joints close tightly, the stepped joints of the seal unit however being left slightly open until the parts reach their operating temperature. While said housing cover with the assembled top half of the unit installed therein is being lowered, the stepped joint between the seal unit halves causes the latter to be guided and keyed together into correct alignment. To insure smooth action, various corners of the stepped joint should be rounded and the sliding surfaces slightly relieved.

Any desired form of labyrinth elements may be employed in connection with the suspended mounting hereinbefore described, but when inwardly projecting annular ribs or seal strips are formed on the rings enclosing the spindle, those at the adjoining sides of each ring—designated by the numeral 14a in Figs. 3 and 4—are split in half and made stouter to better withstand high fluid pressure and handling during manufacture. With a split seal strip or continuation of the series of ribs at the juncture of the rings A, C and C, B, respectively, and the segment joints overlapping as they do, solid or completely closed annular ribs 14a will be formed at the said junctures, thus bridging the gap g which remains while the seal unit is cold. Whereas the annular ribs 14 stay open at the said gap g along the stepped joints of the seal unit, the halved seal strips 14a, due to their overlapping action, form an unbroken annular rib around the spindle 12 and promote a more effective seal at the time when the turbine is being started and heated for operation.

In the design of this present device it has been an object to avoid close groove fits between the seal unit and the housing—while the parts are cold—in order to avoid sticking when they are heated to the high operating temperatures or when there is an accumulation of rust and scale in the grooves after prolonged service. I have also deemed it desirable to specify only simple and shallow associated grooves for the seal unit suspension in its housing or enclosure, in association with the annular flanges 18 engaging the shoulders 19 to suspend the unit in said enclosure while the two halves of the seal unit are being urged toward each other by the springs 22. When the parts are heated to the operating temperature and expand, this sealing organization will locate itself accurately concentric relative to the spindle or shaft. However, there shall still be a very slight looseness present between the flanges 18 of the rings A and B and the annular retaining ledge 19 of the housing in order to insure the perfect closure of the opposite stepped horizontal joints of the seal unit.

It will be understood that in the construction of the several parts of the suspension mounting for the stationary elements or ribs due allowance is made for expansion and contraction, and although there are provided predetermined gaps between the parts at the time of assembly the particular construction contemplates effectiveness of the seal regardless of temperature conditions and expansion prevailing at the particular location of each seal unit. The prime reason for providing the aforementioned gaps is the fact that for the seal unit construction a metal is used that has preferably a higher coefficient of expansion than the metal used for the enclosure or housing. When the seal unit is to be used for a purpose wherewith no elastic fluid of high temperature is employed, the design features will be similar except that the above mentioned compensating gaps will be omitted.

Each time the turbine or other heat engine, in which the seal unit is installed, is started the following operating cycle relative to each seal unit takes place. A priming stream of the high-pressure fluid medium rushing along any available open path enters, fills, and leaves the intermediate chamber f through the slight gap g in the segments of the rings A and B, respectively. While passing through the chamber f this moderate flow of the high-temperature elastic fluid heats the peripheral surfaces of the seal unit segments, causing the latter to expand around the spindle a very small distance in both directions, thereby diminishing and then promptly closing said gaps g along the stepped joints at all points. Axial expansion of the seal unit also lightly closes the cold gap shown at the circular seat e. This mechanical action, by virtue of the expansion of the seal unit in excess or over the expansion of the spindle and housing parts, automatically isolates the chamber f by throttling down the flow of the elastic fluid to a negligible trickle which thereafter serves to keep the seal unit uniformly heated. While this cycle has taken place, no appreciable flow of the fluid medium has passed along the spindle through its labyrinth, due to the sealing action of the continuous seal strips of ribs 14a at the junctures between the rings A and C and particularly between the rings C and B. Effective sealing action of these strips or ribs 14a also prevents spreading apart of the halves of the seal unit when starting the turbine, which might establish a permanent leakage path along the spindle. It should be noted in connection with the operating cycle of this seal unit that the full sealing effect develops gradually—permitting the seal unit to expand fully for rigid support in the housing—thus avoiding mechanical overstress of the parts under the extremely high fluid pressure.

Although I have shown and described the several rings as being made in segments, with each group of upper and lower segments rigidly connected together to form a single assembly or half section supporting the stationary labyrinth elements, said half section may also be made integral and yet retain the essential features of construction providing for effective operation. My invention also contemplates other modifications or changes within the spirit and scope of the appended claims.

I claim:

1. A spindle seal or labyrinth packing including concentric ribs on the rotatable spindle and stationary ribs within a ring surrounding the spindle to retard the flow of elastic fluid through the packing, of a suspension unit for supporting the stationary ribs of the labyrinth comprising a center ring and supporting rings at opposite sides thereof and rigidly connected thereto, the several rings being each made up of segments and the supporting rings constructed and assembled to form stepped overlapping joints between the individually connected suspension unit sections thus created, said stepped joints being adapted to obstruct and retard the flow of elastic fluid, and unidirectional laterally projecting flanges on the supporting rings; in association with a housing recessed to receive the suspension unit and having retaining ledges with which the lateral projections on the supporting rings engage for effecting central positioning of the suspension unit in the housing, and means for urging the individual segment assemblies of rings towards each other.

2. A spindle seal or labyrinth packing including concentric ribs on the rotatable spindle and stationary ribs within a ring surrounding the spindle to retard the flow of elastic fluid through the packing, of means for supporting the stationary ribs of the labyrinth comprising a center ring and supporting rings at opposite sides thereof rigidly connected thereto, the several rings being made up of segments and enclosed within a housing with a space between the center ring and housing to form an intermediate fluid pressure zone, interlocking means forming unidirectional spigot seats between the supporting segmental rings and housing to effect central positioning of all segments in the housing and create said intermediate zone or annular fluid pressure chamber, and springs interposed between the segments of the supporting rings and housing for urging the segments towards each other in conjunction with said fluid pressure chamber.

3. A spindle seal or labyrinth packing including concentric ribs on the rotatable spindle and stationary ribs surrounding the same to retard the flow of elastic fluid through the packing, of means for supporting the stationary ribs of the labyrinth comprising a center ring carrying said ribs and supporting rings at opposite sides thereof rigidly connected thereto, the several rings being made up of segments and enclosed within a housing with a space between the center ring and housing to form a steam pressure zone, the contiguous end surfaces of the segments of the rings having grooves which register to form turbulence chambers, and a cooperating circular spigot seat on the same side of each of the supporting rings engaging the contiguous wall of the housing to retard the flow of elastic fluid between these parts of the packing unit, together with means for interlocking engagement of the segments of the supporting rings with the housing to effect central positioning of the opposing ribs of the labyrinth, and springs interposed between the housing and supporting rings to assure and augment, in operation, the effect of the aforementioned pressure zone.

4. A spindle seal or labyrinth packing including concentric ribs on a rotatable spindle and stationary ribs surrounding the same to retard the flow of elastic fluid through the packing, of means for supporting the stationary ribs of the labyrinth comprising a center ring and supporting rings or greater outside diameter at opposite sides thereof rigidly secured thereto, the several rings having the stationary ribs being made up of segments with the contiguous ends of the supporting ring segments overlapping and the faces thereof relieved by grooving to increase contact unit pressure and said meeting face grooves combining to form turbulence chambers, laterally projecting rim flanges on the supporting rings at the inner edge of one and outer edge of the other, and an annular groove in the side of each ring adjoining the flange; together with a housing recessed to receive the rings with unidirectional shoulders coacting with the aforementioned rim flanges for centrally, yieldingly suspending the ring assembly in the housing, flat springs interposed between the outer rings and housing, and keys for preventing rotation of the ring assembly in the stationary housing.

5. In combination with a rotatable spindle or shaft, of a stationary series of annular seal ribs forming a labyrinth surrounding the same and carried by a segmental ring the segment joints of which comprise projecting portions for mutual interlocking of the opposing segments and form stepped joints to retard the flow of elastic fluid, means for suspension of the interlocked assembly in a housing enclosing the same consisting of annular rims projecting laterally in the same direction, said rim projections engaging annular shoulders in the housing forming spigot seats; the elastic fluid pressure acting against the aforementioned interlocked assembly in the direction of the projection of the rim flanges thereby forcing said assembly against the spigot seats to retard the flow of the elastic fluid through the supporting parts for the stationary seal ribs.

6. The combination with a housing and a rotatable spindle, the latter provided with circumferential seal ribs, of a segmental supporting ring or unit-carrying the stationary seal ribs comprising a center section or segmental ring and two outer sections or segmental rings rigidly secured at the opposite sides thereof, the several segments of the unit being assembled so that the contiguous ends of the segments of the supporting rings overlap one another; the stationary seal ribs located at the junctures between the center ring and outer rings having one-half integral with the center ring and the other half integral with the outer rings, forming in connection with the overlapping joints a practically unbroken annular rib surrounding the rotatable spindle even should said joints of the supporting ring remain slightly open; together with means for interlocking suspension of the unit concentrically within the housing, and means for effecting a yielding action and resiliency of the suspension interlock.

JOHN H. ZESEWITZ.